US012221225B2

(12) United States Patent
Collado et al.

(10) Patent No.: US 12,221,225 B2
(45) Date of Patent: Feb. 11, 2025

(54) SENSOR LIFT MECHANISM FOR AIRCRAFT

(71) Applicant: Textron Aviation Inc., Wichita, KS (US)

(72) Inventors: Paul C. Collado, Wichita, KS (US); Jonathan J. Kalinowski, Wichita, KS (US); Patrick Klausmeyer, Wichita, KS (US); Lance A. Kawabata, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 295 days.

(21) Appl. No.: 18/046,797

(22) Filed: Oct. 14, 2022

(65) Prior Publication Data

US 2023/0122783 A1 Apr. 20, 2023

Related U.S. Application Data

(60) Provisional application No. 63/257,344, filed on Oct. 19, 2021.

(51) Int. Cl.
*B64D 47/00* (2006.01)
(52) U.S. Cl.
CPC .................... *B64D 47/00* (2013.01)
(58) Field of Classification Search
CPC .................. B64D 47/00; B64D 47/02
See application file for complete search history.

(56) References Cited

U.S. PATENT DOCUMENTS

| | | | |
|---|---|---|---|
| 7,806,368 B1 * | 10/2010 | Smith | B64C 1/1415 244/129.1 |
| 8,702,036 B2 | 4/2014 | Curry et al. | |
| 9,126,697 B2 * | 9/2015 | Ullman | B64C 1/40 |
| 9,348,197 B2 * | 5/2016 | Lewis | F16M 11/123 |
| 10,816,056 B2 * | 10/2020 | Chang | B64D 47/08 |
| 2005/0029398 A1 * | 2/2005 | Lowe | B64D 47/08 244/118.1 |
| 2005/0029399 A1 * | 2/2005 | Lowe | B64D 47/08 244/118.1 |
| 2011/0315822 A1 * | 12/2011 | Fairchild | E05F 15/652 244/129.5 |
| 2022/0016758 A1 * | 1/2022 | Whitiker | B65G 1/07 |
| 2023/0122760 A1 * | 4/2023 | Collado | E05D 15/1047 49/362 |

* cited by examiner

*Primary Examiner* — Donald J Wallace
*Assistant Examiner* — Jalal C Coduroglu
(74) *Attorney, Agent, or Firm* — Avek IP, LLC

(57) ABSTRACT

A sensor lift mechanism for deploying a sensor from a tail cone of an aircraft includes a frame mounted onto a side wall of the tail cone via a mounting assembly. The frame includes a first roller track and a second roller track aligned with the first roller track. A roller carriage assembly includes a plurality of rollers configured for rolling along the first and second roller tracks. A sensor platform is mechanically coupled to the carriage assembly and configured for mounting the sensor thereto. A drive unit is operatively coupled to the frame. The drive unit translates the roller carriage assembly vertically between the first and second roller tracks to move the sensor platform between a stowed position and a deployed position. A floor of the tail cone includes a track door configured to open for deploying the sensor beneath the tail cone.

20 Claims, 15 Drawing Sheets

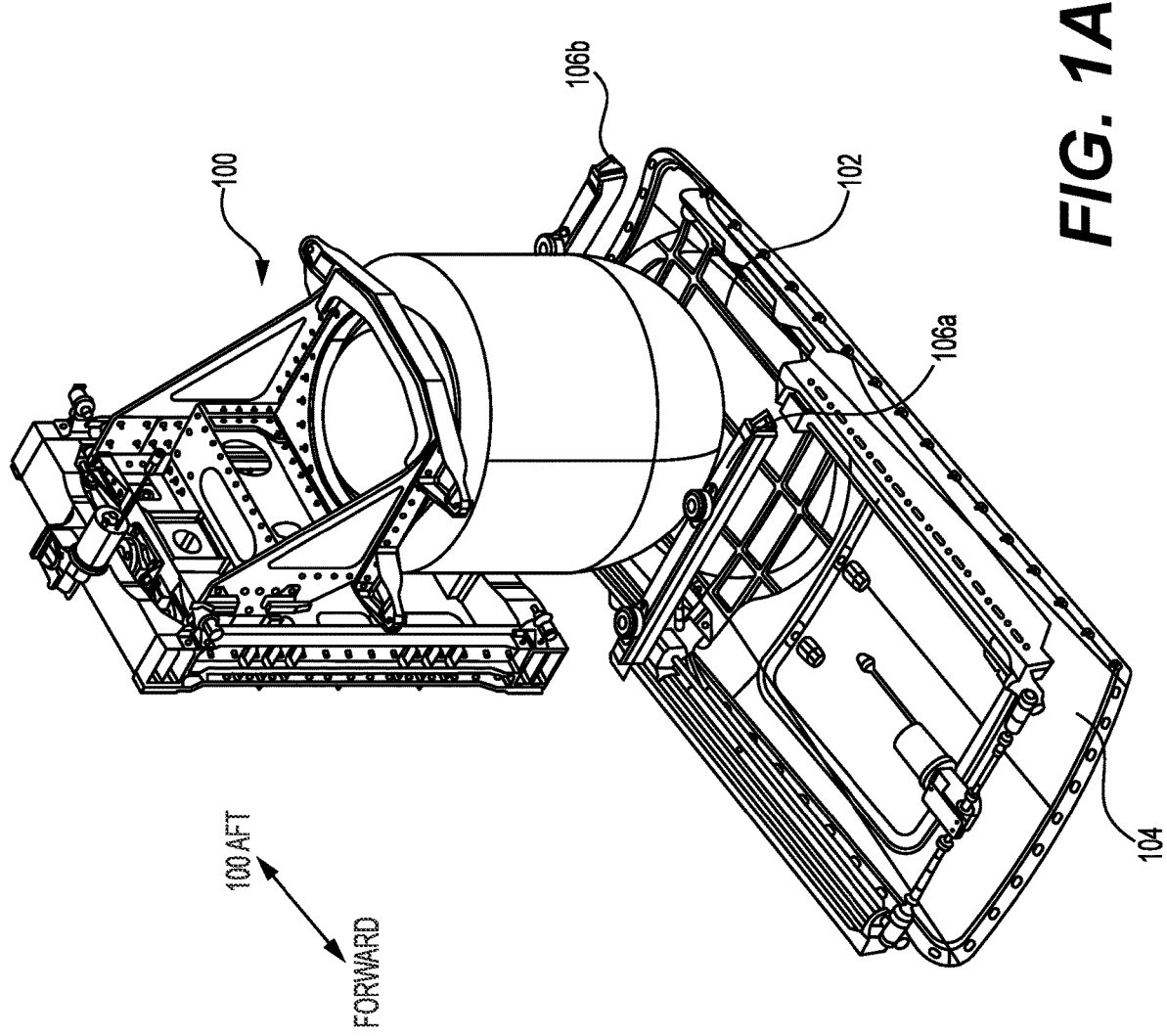

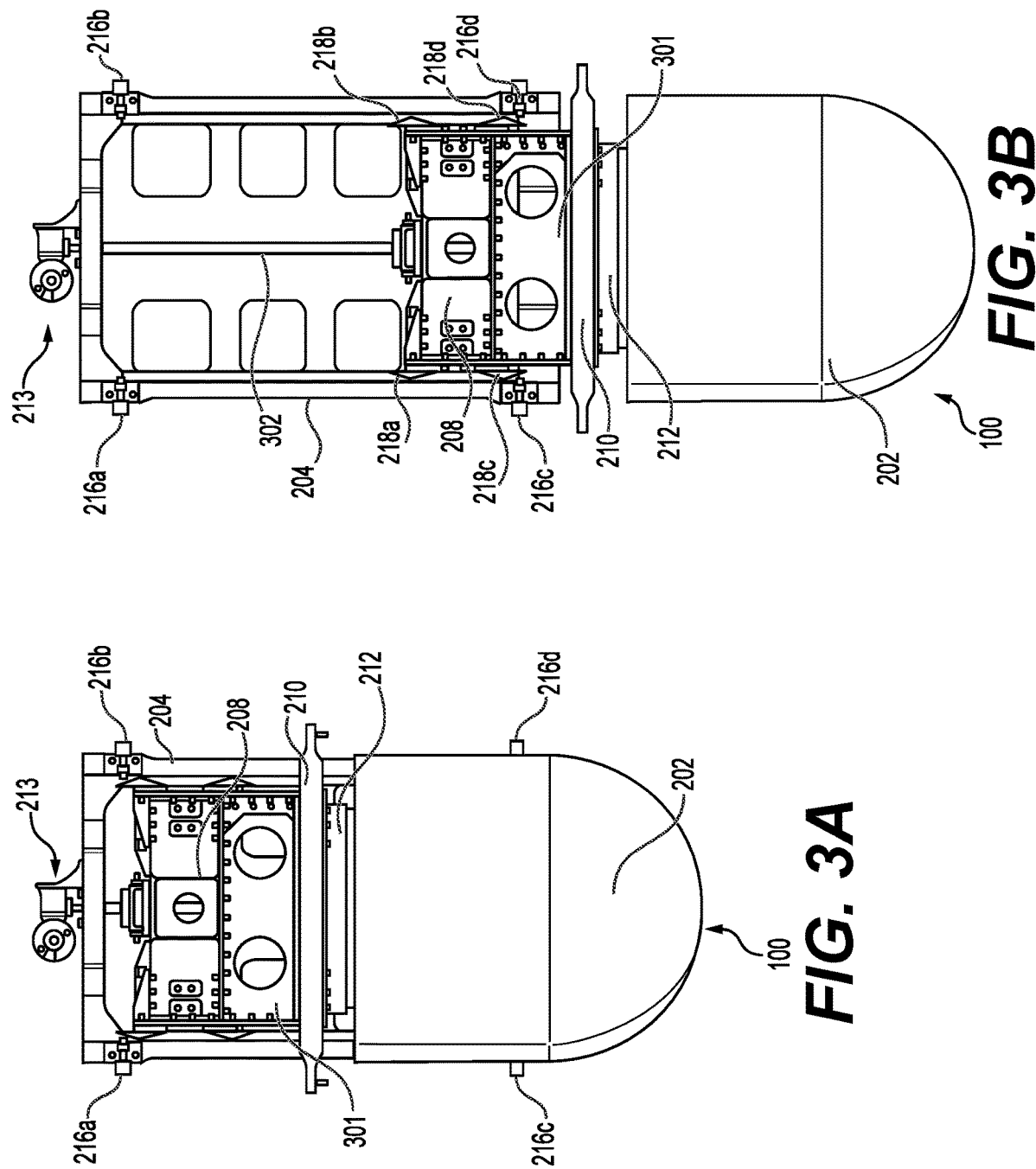

SENSOR LIFT MECHANISM FOR AIRCRAFT

CROSS-REFERENCE TO RELATED APPLICATIONS

This application claims the benefit of priority of U.S. Provisional Patent Application No. 63/257,344, entitled Sensor Lift Mechanism for Aircraft and filed on Oct. 19, 2021, the disclosure of which is herein incorporated by reference in its entirety.

BACKGROUND OF THE INVENTION

1. Field

The disclosed embodiments relate generally to the field of lifting mechanisms. More specifically, the embodiments relate to the operation of a lifting mechanism for deploying and retracting sensors in an aircraft.

2. Description of the Related Art

Many different types of sensor lifts have been described in the prior art. For example, U.S. Pat. No. 7,806,368 to Smith et al. describes a system for deploying a sensor out of the rear cargo ramp of an aircraft. U.S. Pat. No. 8,702,036 to Curry et al. describes an apparatus for carrying cargo in an aircraft that comprises a rack assembly mounted in an upper part of the fuselage.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a sensor lift mechanism for use in an aircraft includes: a frame, including: a first roller track disposed on a first vertical beam; and a second roller track disposed on a second vertical beam, wherein the first vertical beam and the second vertical beam are substantially in parallel; a roller carriage assembly disposed within the frame, including: a first pair of track rollers configured to roll up a side wall of the first roller track; a second pair of track rollers configured to roll up a side wall of the second roller track; a first pair of drag rollers configured to roll up a back wall of the first roller track; and a second pair of drag rollers configured to roll up a back wall of the second roller track; and a drive unit mounted to an upper beam of the frame, wherein the drive unit powers a ball screw and translates the roller carriage assembly vertically between the first vertical beam and the second vertical beam to move a sensor between a stowed position and a deployed position.

In an embodiment, a sensor lift mechanism for deploying a sensor from a tail cone of an aircraft includes: a frame mounted onto a side wall of the tail cone via a mounting assembly, wherein the frame includes a first roller track and a second roller track aligned with the first roller track; a roller carriage assembly having a plurality of rollers configured for rolling along the first and second roller tracks; a sensor platform mechanically coupled to the carriage assembly, wherein the sensor platform is configured for mounting the sensor thereto; and a drive unit operatively coupling to the frame, wherein the drive unit translates the roller carriage assembly vertically between the first and second roller tracks to move the sensor platform between a stowed position and a deployed position, wherein a floor of the tail cone includes a track door configured to open for deploying the sensor beneath the tail cone.

BRIEF DESCRIPTION OF THE SEVERAL VIEWS OF THE DRAWINGS

FIG. 1A illustrates a sensor lift mechanism in relation to a track door disposed on a tail cone exterior of an aircraft for some embodiments;

FIG. 3A illustrates the sensor lift mechanism in a retracted position for some embodiments;

FIG. 3B illustrates the sensor lift mechanism in a deployed position for some embodiments;

Figure 1B:
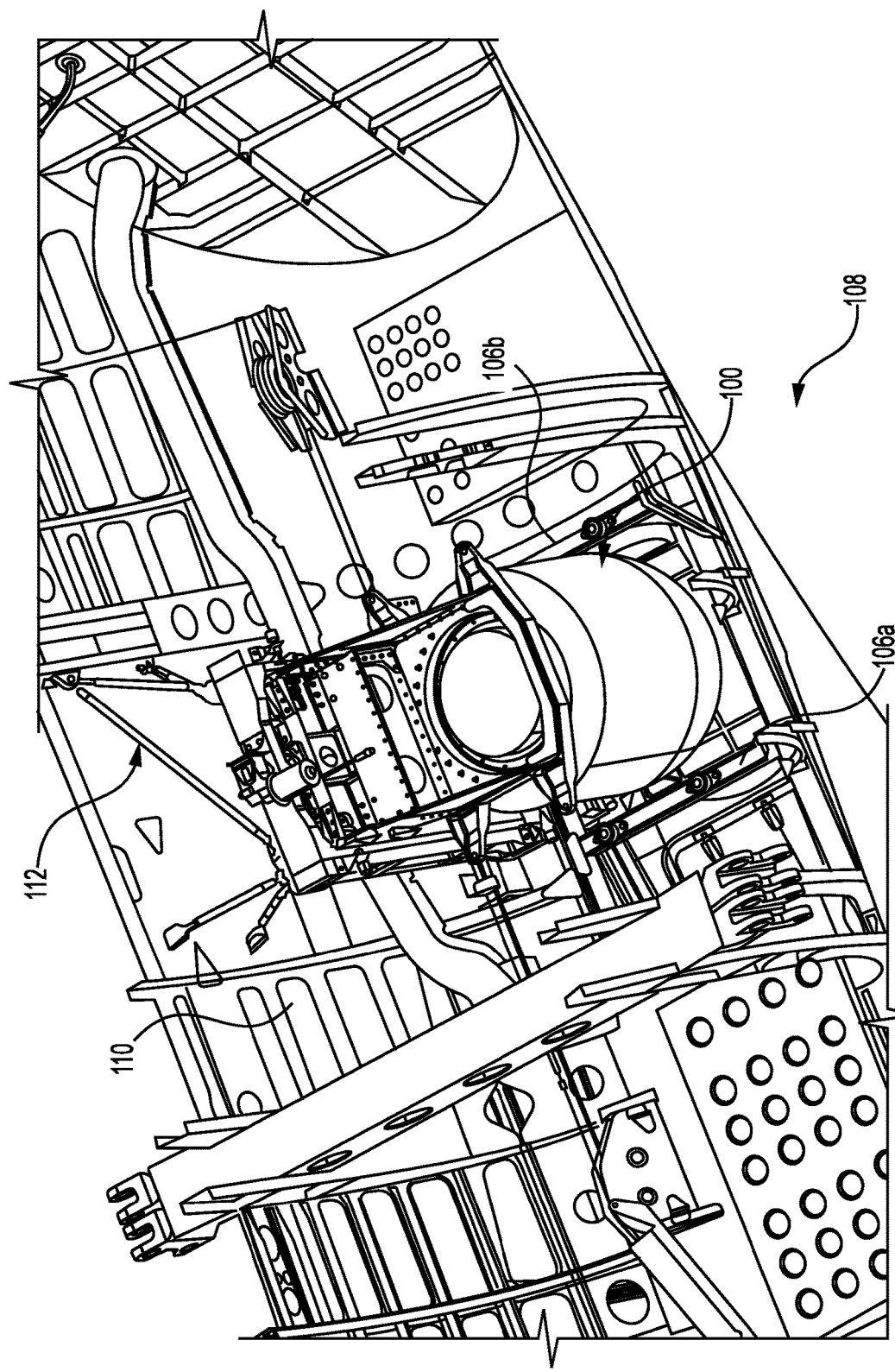
FIG. 1B depicts a left hand isometric view illustrating the positioning of the sensor lift mechanism within the tail cone of the aircraft for some embodiments.

Illustrative embodiments are described in detail below with reference to the attached drawing figures, which are incorporated by reference herein and wherein:

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments are generally directed to a sensor lift mechanism for use in an aircraft to deploy and retract a sensor from an aircraft compartment while the aircraft is being operated over a large range of airspeeds. While typical lift mechanisms often comprise frames mounted substantially parallel to the floor of an aircraft with a sensor disposed below the frame, the sensor lift mechanism of embodiments described herein may be mounted substantially sideways within a tail cone of the aircraft such that the sensor lift mechanism is substantially parallel to the side walls of the tail cone with the frame disposed behind the sensor. By utilizing the sideways orientation, the sensor lift mechanism may be installed into aircraft having preexisting systems (e.g., refrigeration systems) in the tail cone. The sensor lift mechanism may utilize a set of rollers that allows for the sensor lift mechanism to react to the unconventional loads resulting from the sideways mounting orientation. The rollers may translate on roller tracks that are configured to prevent any induced damaged from propagating to other components of the sensor lift mechanism. The use of rollers instead of commonly-used slide bushings may substantially eliminate any debris from being trapped within the mechanism that would reduce the ability for the sensor lift mechanism to operate. The arrangement of the rollers may also produce less friction than other sensor lift mechanisms. The sensor lift mechanism may comprise a substantially rigid platform in which a sensor may be installed. The platform may have a roller carriage assembly on which the set of rollers are disposed. A first subset of the rollers may ride in a linear track, and a second subset of the rollers may ride on a track plate. The rollers may be arranged to function as discrete load paths to react to substantially any loads imposed on the sensor lift mechanism during operation.

FIG. 1A illustrates an overview of the sensor lift mechanism 100 in relation to other aircraft components for some embodiments. Sensor lift mechanism 100 may be disposed within a tail cone of an aircraft (see FIG. 1B) and may be positioned substantially above a track door 102. During operation of sensor lift mechanism 100, track door 102 may open inwards within the plane and forwards towards the nose of the plane, thereby leaving an opening (not shown) for sensor lift mechanism 100 to deploy a sensor therethrough. Track door 102 may be disposed within a portion of fairing access panel 104, and fairing access panel 104 may be disposed on an outer surface of the tail cone and provide maintenance access to the inside of the tail cone. A first isolator beam 106a and a second isolator beam 106b may be disposed on opposite sides of sensor lift mechanism 100 and are configured to reduce vibrations and dampen forces applied to sensor lift mechanism 100 when in a deployed position. Isolator beams 106a, 106b may comprise an isolating material to aid in reducing vibrations as will be discussed further below. First isolator beam 106a may be disposed on a forward side of sensor lift mechanism 100, and second isolator beam 106b may be disposed on an aft side of sensor lift mechanism 100 as shown. In some embodiments, isolator beams 106a, 106b extend transversely across the inside of the tail cone of the aircraft. As illustrated below with respect to FIG. 4A, platform structure 206 may rest on isolator beams 106a, 106b when deployed. Isolator beams 106a, 106b are discussed in further detail below with respect to FIGS. 4A and 4B.

Figure 1C:
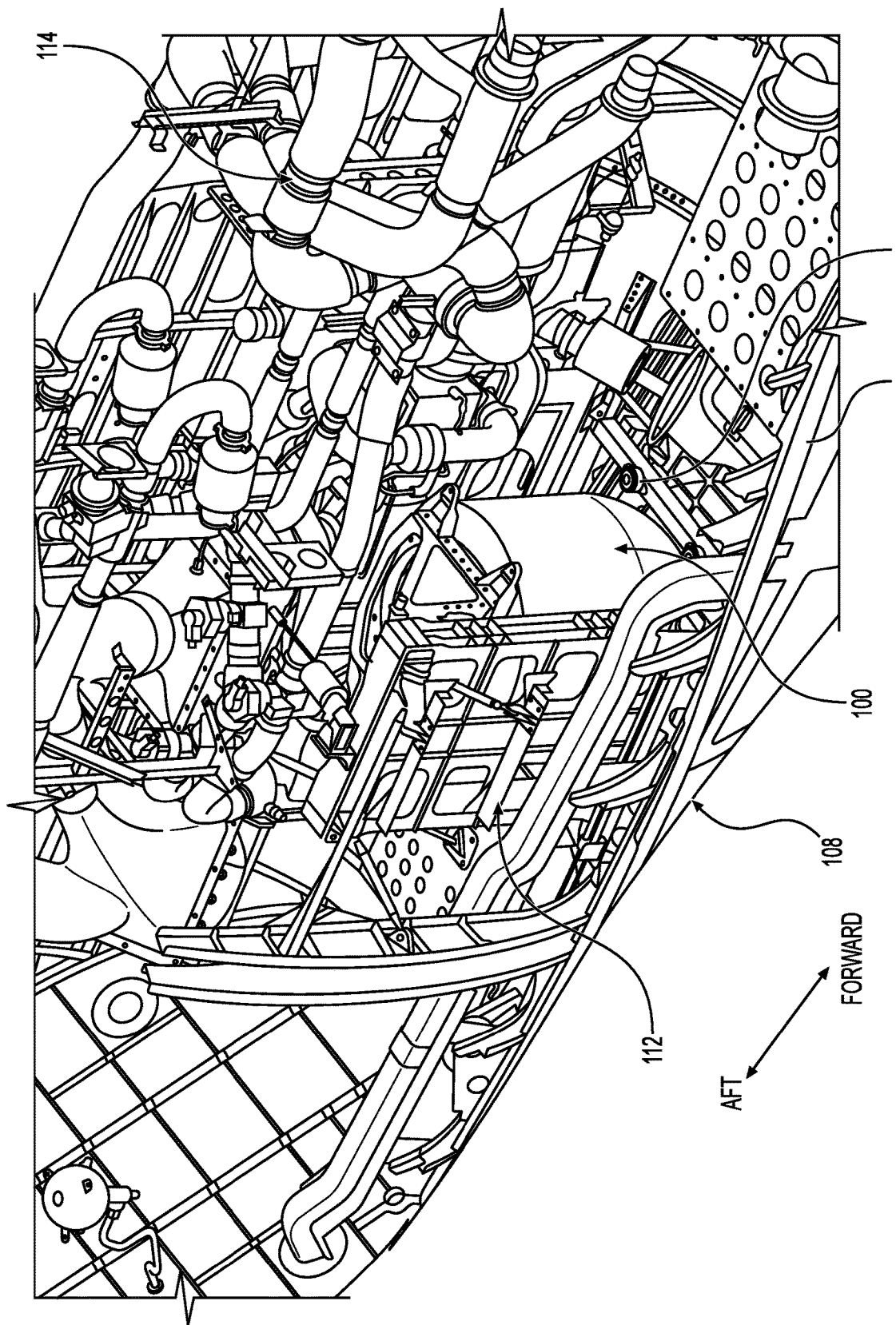
FIG. 1C depicts a right hand, isometric view illustrating the positioning of the sensor lift mechanism within the tail cone of the aircraft for some embodiments.

FIG. 1B illustrates a left-hand isometric view, and FIG. 1C illustrates a right-hand isometric view of the positioning of sensor lift mechanism 100 within a tail cone 108 for some embodiments. As shown in FIG. 1B, sensor lift mechanism 100 may be mounted onto a side wall 110 of tail cone 108 via mounting assembly 112. Mounting assembly 112 may comprise a series of links, brackets, hinges, bolts, screws, clamps, and the like for securing sensor lift mechanism 100 to side wall 110. Mounting sensor lift mechanism 100 to side wall 110 may allow for the installation of sensor lift mechanism 100 in tail cone 108 without having to adjust or reposition any equipment or machinery already present. For example, aircraft often have refrigeration systems 114 (see FIG. 1C) installed that take up a substantially large amount of space in tail cone 108. As such, it may not be feasible to install a mechanism with a frame disposed across the fuselage. Thus, installing sensor lift mechanism 100 in the illustrated position allows for the deployment of a sensor out of tail cone 108 without having to adjust any preexisting systems. However, embodiments are not limited to mounting sensor lift mechanism 100 at the illustrated position, and sensor lift mechanism 100 may be installed in nearly any location within tail cone 108. For example, sensor lift mechanism 100 may be installed to a structural member disposed near the center of tail cone 108.

Figure 2:
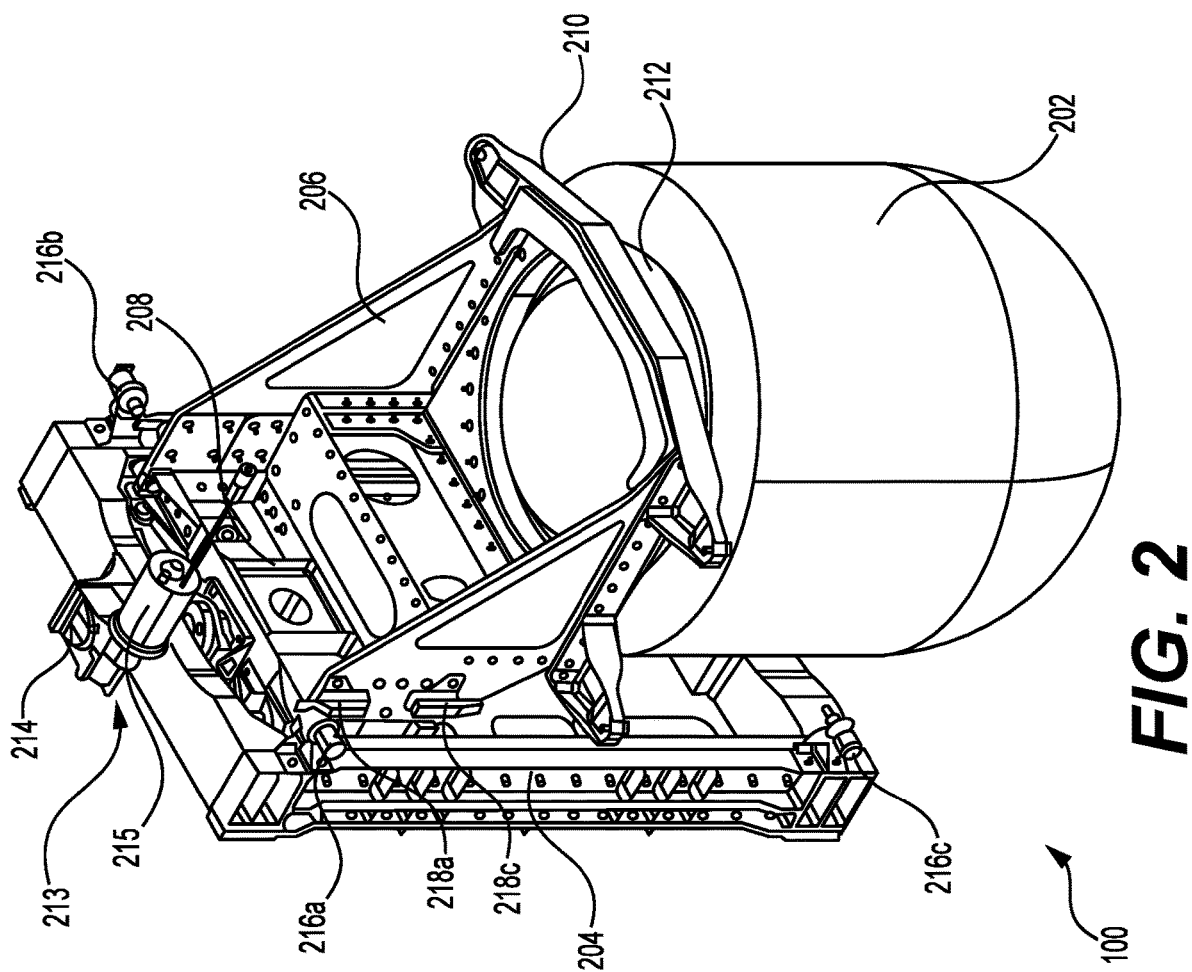
FIG. 2 illustrates the sensor lift mechanism for some embodiments.

FIG. 2 illustrates an isometric view of sensor lift mechanism 100 for some embodiments. Sensor lift mechanism 100 may comprise sensor 202, elevator frame 204, platform structure 206, roller carriage assembly 208, sensor platform 210, adapter plate 212, a drive unit 213 comprising gearbox 214 and motor 215, a first limit switch 216a, a second limit switch 216b, a third limit switch 216c, and a fourth limit switch 216d (see FIG. 3A). Broadly, sensor lift mechanism 100 operates by drive unit 213 powering roller carriage assembly 208 to raise and lower sensor 202 out of the opening formed by opening track door 102. In some embodiments, drive unit 213 powers a ball screw as will be discussed further below with respect to FIG. 9. The motion of sensor lift mechanism 100 may be guided by a set of track rollers disposed on roller carriage assembly 208. The track rollers may have a discrete load path to allow sensor lift mechanism 100 to withstand substantial loads imposed during operation.

In some embodiments, sensor 202 is a camera, a radar, a lidar sensor, or any other sensor. In some embodiments, sensor 202 has a diameter of about 16 inches to about 26 inches. In some embodiments, sensor 202 has a diameter of about 20 inches. In some embodiments, sensor lift mechanism 100 is configured to hold a sensor 202 having a weight of about 245 pounds. Alternatively, other payloads besides sensors may be deployed and retracted from an aircraft compartment using sensor lift mechanism 100 without departing from the scope hereof.

Platform structure 206 may connect roller carriage assembly 208 to sensor platform 210 via a series of bolts, screws, welds, mounting plates, or mounting brackets. In some embodiments, platform structure 206 comprises a substantially thin piece of metal, such as aluminum, stainless steel, or titanium. In some embodiments, platform structure 206 comprises first trigger 218a, second trigger 218b (see FIG. 3B), third trigger 218c, and fourth trigger 218d (see FIG. 3B) configured to trigger limit switches 216a, 216b, 216c, 216d. In some embodiments, adapter plate 212 is connected to sensor platform 210, attaches to sensor 202, and is configured to receive various sized sensors 202 in sensor lift mechanism 100.

Limit switches 216a, 216b, 216c, 216d may control the end travel points of roller carriage assembly 208. When triggers 218a, 218b approach or contact limit switches 216a, 216b, respectively, which are disposed near the top of elevator frame 204, sensor lift mechanism 100 may be considered to be in a retracted position, with sensor 202 disposed within tail cone 108. When triggers 218c, 218d approach or contact limit switches 216c, 216d, respectively, which are disposed near the bottom of elevator frame 204, sensor lift mechanism 100 may be considered to be in a deployed position, with sensor 202 disposed substantially outside of tail cone 108. When any of limit switches 216a, 216b, 216c, 216d are triggered, a signal may be sent to drive unit 213 to power off. Fourth limit switch 216d may be disposed opposite third limit switch 216c and below second limit switch 216b, as shown in FIGS. 3A and 3B. In some embodiments, various other proximity sensors may be used as limit switches 216a, 216b, 216c, 216d, such as infrared, conductive, or inductive proximity sensors or optocouplers.

FIG. 3A illustrates sensor lift mechanism 100 in the retracted (e.g., stowed) position for some embodiments. In some embodiments, sensor lift mechanism 100 also comprises a support plate 301 connecting roller carriage assembly 208 to sensor platform 210. In some embodiments, support plate 301 is fastened to a bottom face of roller carriage assembly 208 near a top end of support plate 301 and fastened to a back face of sensor platform 210 near a bottom end of support plate 301. As illustrated, in the retracted position, the various components of sensor lift mechanism 100 are held substantially near the top (i.e., near drive unit 213) of sensor lift mechanism 100 and within tail cone 108.

Figure 3C:
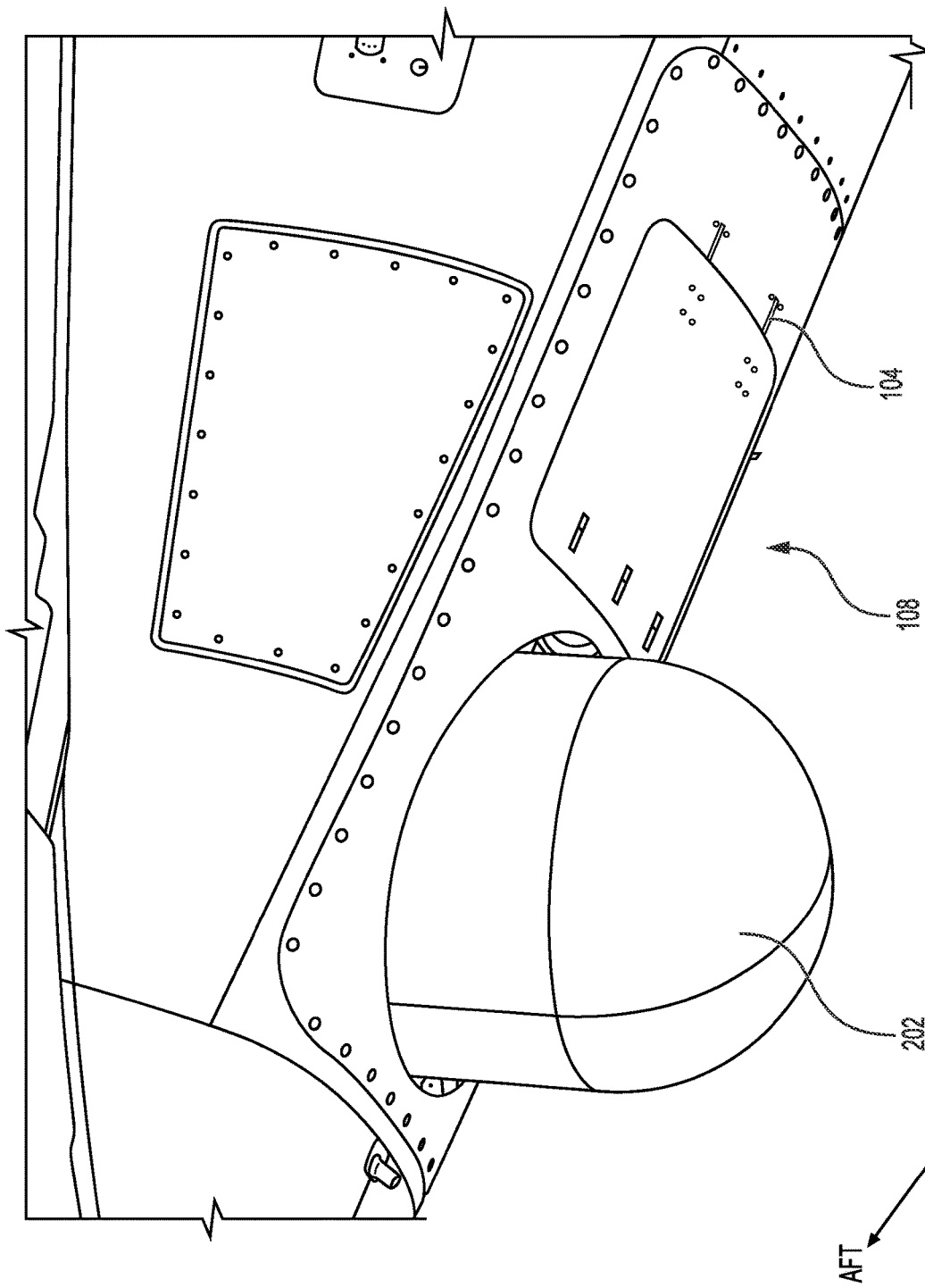
FIG. 3C illustrates the sensor lift mechanism deployed out of the tail cone for some embodiments.

As shown in FIG. 3B, sensor lift mechanism 100 is in the deployed position and roller carriage assembly 208 has translated downwards from the position illustrated in FIG. 3A via drive unit 213 powering ball screw 302. At the illustrated position, triggers 218c, 218d may have triggered third limit switch 216c and/or fourth limit switch 216d, thus pausing motor 215. In some embodiments, sensor lift mechanism 100 extends about 15 inches to about 26 inches vertically between the retracted position and the deployed position. In some embodiments, sensor lift mechanism 100 extends about 18.5 inches vertically between the retracted position and the deployed position. Looking now at FIG. 3C, the deployed position of sensor lift mechanism 100 is illustrated with respect to tail cone 108 of the aircraft. As shown, sensor 202 may deploy out of the opening formed by retracting track door 102 and into the airstream to collect sensor data. In some embodiments, sensor lift mechanism 100 is triggered to deploy sensor 202 upon a detected opening of track door 102. For example, when track door 102 is fully opened, a signal may be sent to drive unit 213 to begin deploying sensor 202. Once third limit switch 216c and/or fourth limit switch 216d are triggered, drive unit 213 may be deactivated. Thereafter, a second signal may be sent to sensor lift mechanism 100 to retract sensor 202 back within tail cone 108. In some embodiments, when first limit switch 216a and second limit switch 216b are triggered during retraction, a signal is transmitted from sensor lift mechanism 100 to track door 102 to initiate the closing of track door 102 in tail cone 108. In some embodiments, sensor lift mechanism 100 deploys in about 16 seconds to about 22 seconds. In some embodiments, sensor lift mechanism 100 deploys in about 18.5 seconds. In some embodiments, sensor lift mechanism 100 retracts in about 20 to about 30 seconds. In some embodiments, sensor lift mechanism 100 retracts in about 22 to about 23 seconds at a flight speed of about 300 knots.

Figure 4A:
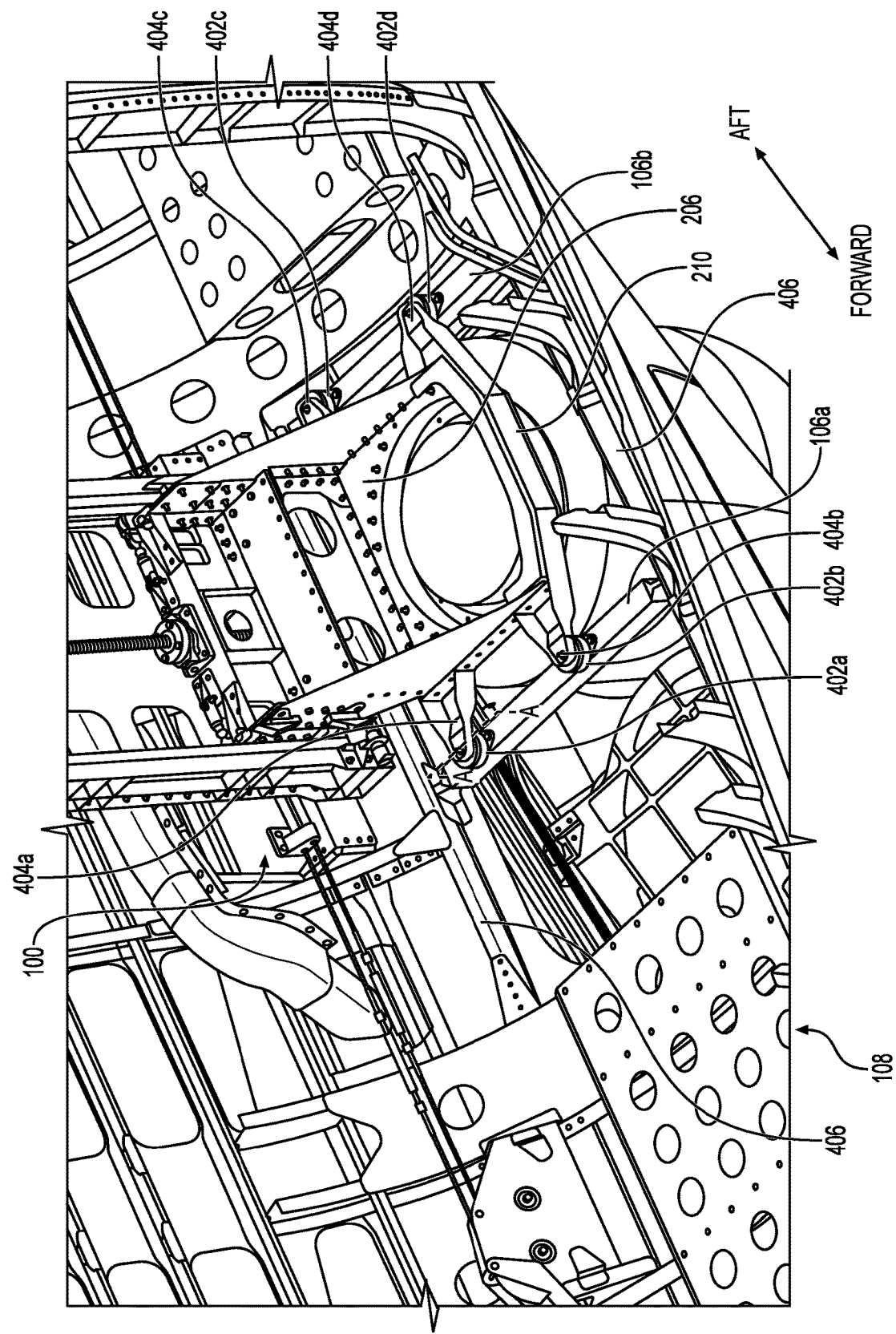
FIG. 4A illustrates the sensor lift mechanism resting on a pair of isolator beams in the deployed position for some embodiments.

FIG. 4A illustrates a right hand, isometric view of sensor lift mechanism 100 in the deployed position for some embodiments, as shown, sensor platform 210 may rest on and abut isolator beams 106a, 106b when sensor 202 is deployed. As described above, isolator beams 106a, 106b may be disposed substantially laterally within tail cone 108. In some embodiments, isolator beams 106a, 106b comprise a length of about 22 inches to about 26 inches. In some embodiments, isolator beams 106a, 106b comprise a length of about 24 inches. In some embodiments, isolator beams 106a, 106b comprise an isolating material 418 (see FIG. 4B) to aid in vibration damping, as will be discussed in further detail below. In some embodiments, first isolator beam 106a and second isolator beam 106b are substantially similar.

First isolator beam 106a may comprise a first isolator 402a and a second isolator 402b, and second isolator beam 106b may comprise a third isolator 402c and a fourth isolator 402d. In some embodiments, first isolator 402a is aligned with third isolator 402c, and second isolator 402b is aligned with fourth isolator 402d, as depicted in FIG. 4A. In some embodiments, isolators 402a, 402b, 402c, 402d are substantially circular, cylindrical, square, rectangular, hexagonal, or any other geometric shape. Sensor Platform 210 may comprise a substantially square or rectangular shaped body with four outriggers 404a, 404b, 404c, 404d extending outwards. In some embodiments, first outrigger 404a and second outrigger 404b extend towards the forward end of the aircraft, and third outrigger 404c and fourth outrigger 404d extend towards the aft end of the aircraft. First outrigger 404a may correspond to first isolator 402a (see FIG. 4B), second outrigger 404b may correspond to second isolator 402b, third outrigger 404c may correspond to third isolator 402c, and fourth outrigger 404d may correspond to fourth isolator 402d. Alternatively, sensor lift mechanism 100 may be rotated 180 degrees to face opposite the direction shown in FIG. 4A such that first outrigger 404a corresponds with fourth isolator 402d, second outrigger 404b corresponds with third isolator 402c, third outrigger 404c corresponds with second isolator 402b, and fourth outrigger 404d corresponds with first isolator 402a. Broadly, sensor lift mechanism 100 may be mounted in any orientation (i.e., oriented towards the front, back, left or right) within tail cone 108. In some embodiments, when sensor lift mechanism 100 is deployed, outriggers 404a, 404b, 404c, 404d are configured to mate with isolators 402a, 402b, 402c, 402d as will be discussed in further detail below. By resting sensor lift mechanism 100 onto isolator beams 106a, 106b, vibrations that would propagate to sensor 202 may be reduced.

In some embodiments, isolator beams 106a, 106b are configured to attach to intercostals 406 within tail cone 108 via bolts, screws, nuts, brackets, clamps, welds or other similar fastening means. In some embodiments, intercostals 406 are structural beams of tail cone 108. Intercostals 406 may support loads applied to isolator beams 106a, 106b. Intercostal 406 may be disposed substantially perpendicular to isolator beams 106a, 106b (e.g., extending in the forwards-to-aft direction). In some embodiments, isolator beams 106a, 106b are removable from the aircraft and may be detached from intercostals 406.

Figure 4B:
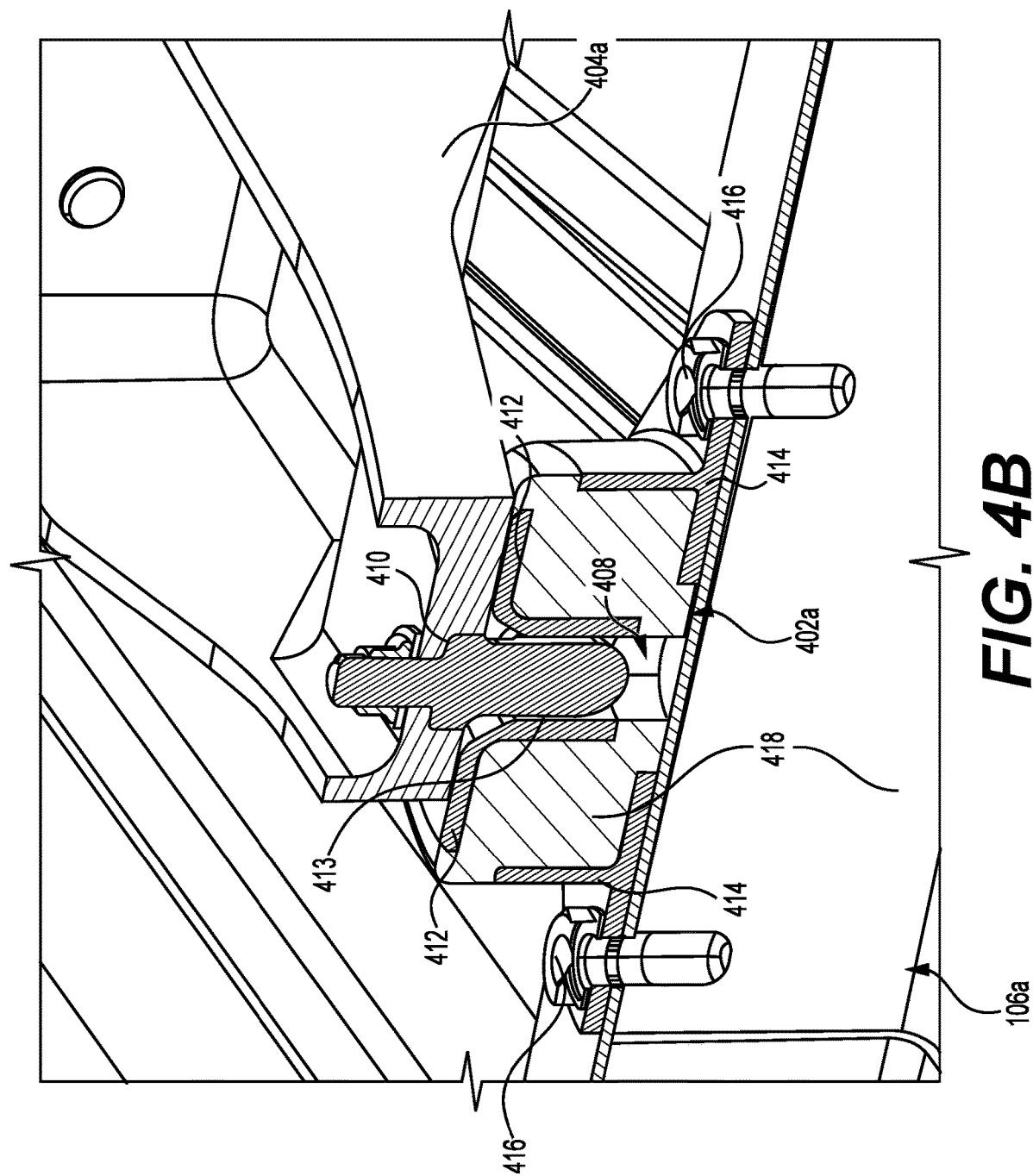
FIG. 4B illustrates a cross section of an isolator of the isolator beams for some embodiments.

FIG. 4B illustrates a cross section of the interface of first isolator 402a and first outrigger 404a cut along the A-A line illustrated in FIG. 4A for some embodiments. In some embodiments, isolators 402a, 402b, 402c, 402d are substantially similar. In some embodiments, outriggers 404a, 404b, 404c, 404d are substantially similar. As described above, when sensor lift mechanism 100 deploys, sensor platform 210 may lower and abut against isolator beams 106a, 106b. Isolator beams 106a, 106b may be configured to substantially resist the compressive force from sensor lift mechanism 100 and the lateral/longitudinal load during operation. Isolators 402a, 402b, 402c, 402d and outriggers 404a, 404b, 404c, 404d may serve to reduce lateral and longitudinal forces applied. As illustrated, isolators 402a, 402b, 402c, 402d are separate components from isolator beams 106a, 106b that are then fastened to isolator beams 106a, 106b. In some embodiments, isolators 402a, 402b, 402c, 402d may be formed as part of isolator beams 106a, 106b such as via a casting process, for example. Alternatively, isolator beams 106a, 106b, could be formed with holes or slots and isolators 402a, 402b, 402c, 402d inserted therein.

First isolator 402a may comprise a receptacle 408 for receiving a dagger pin 410. The dagger pin 410 is an extension of the first outrigger 404a oriented vertically for insertion into receptacle 408. Receptacle 408 may be a substantially cylindrical opening oriented vertically as shown. In some embodiments, receptacle 408 is substantially circular, rectangular, or any other geometric shape configured to receive a similarly shaped dagger pin 410 therein. In some embodiments, first isolator 402a comprises upper isolator housing 412 for guiding dagger pin 410 into isolator 402a. In some embodiments, upper isolator housing 412 is disposed on an inner surface of receptacle 408. Upper isolator housing 412 may comprise a substantially conical taper such that, in the event dagger pin 410 is not directly aligned with the center of isolator 402a, dagger pin 410 may contact upper isolator housing 412, and the taper may help self-align dagger pin 410 into isolator 402a. In some embodiments, dagger pin 410 comprises a rounded distal end 413 which may be configured to assist with aligning dagger pin 410 within upper isolator housing 412 (e.g., the rounded shape of distal end 413 may have a curvature that matches the conical taper of upper isolator housing 412). In some embodiments, upper isolator housing 412 comprises stainless steel, aluminum, titanium, or any combination thereof. First isolator 402a may also comprise lower housing 414 on either side of receptacle 408. In some embodiments, lower housing 414 comprises at least one opening for receiving a fastener therein, such as bolts 416 for example, thus securing first isolator 402a to first isolator beam 106a. As illustrated best in FIG. 4A, lower housing 414 may encompass a perimeter of first isolator 402a. In some embodiments, lower housing 414 comprises stainless steel, aluminum, titanium, or a combination thereof.

In some embodiments, isolator beams 106a, 106b (including isolators 402a, 402b, 402c, 402d) comprise isolation material 418 that provides vibration dampening for first isolator beam 106a. By utilizing isolation material 418 with isolator beams 106a, 106b, isolator beams 106a, 106b may function substantially similar to a mechanical spring.

In some embodiments, isolation material 418 comprises a rubber, an elastomer, or a thermoset material. In some embodiments, isolation material 418 comprises cold-cast silicone rubber. The use of isolation material 418 and the mating of isolators 402a, 402b, 402c, 402d, with outriggers 404a, 404b, 404c, 404d may allow for isolator beams 106a, 106b to substantially dampen vibrations from the airstream that propagate to sensor 202.

Figure 5:
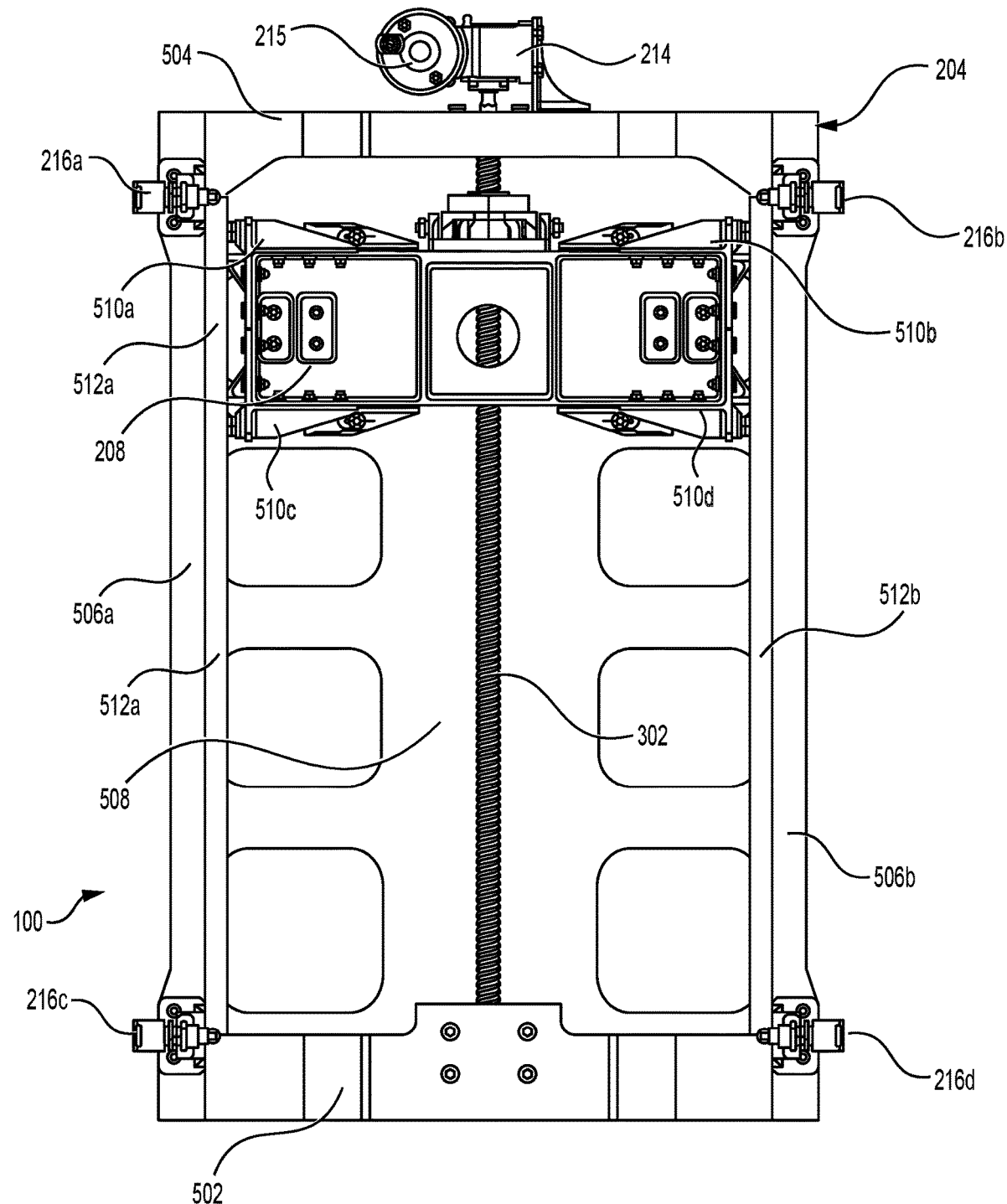
FIG. 5 illustrates a planar view of the sensor lift mechanism for some embodiments.

Turning now to FIG. 5, a planar view of sensor lift mechanism 100 is illustrated for some embodiments. As shown, elevator frame 204 may comprise a lower beam 502, an upper beam 504, a first vertical beam 506a, and a second vertical beam 506b. In some embodiments, elevator frame 204 is substantially rectangular with lower beam 502 disposed opposite upper beam 504 and vertical beams 506a, 506b disposed substantially perpendicular to lower beam 502 and upper beam 504 and opposite one another. In some embodiments, lower beam 502 and upper beam 504 have a length of about 12 inches to about 24 inches. In some embodiments, lower beam 502 and upper beam 504 have a length of about 18.25 inches. In some embodiments, vertical beams 506a, 506b have a height of about 24 inches to about 40 inches. In some embodiments, vertical beams 506a, 506b have a height of about 32.5 inches. In some embodiments, limit switches 216a, 216b, 216c, 216d are disposed on vertical beams 506a, 506b. Upper beam 504 may be positioned near drive unit 213 as illustrated. In some embodiments, elevator frame 204 comprises aluminum, stainless steel, titanium, or other like metals.

Sensor lift mechanism 100 may also comprise a backing plate 508 for supporting the various components of sensor lift mechanism 100. Backing plate 508 may extend vertically from lower beam 502 upwards to upper beam 504 and laterally from first vertical beam 506a to second vertical beam 506b. In some embodiments, backing plate 508 is substantially rectangular and may comprise an array of cavities therethrough. In some embodiments, backing plate 508 comprises aluminum, stainless steel, titanium, or other like metals. As illustrated best with respect to FIG. 1C, mounting assembly 112 may be connected to backing plate 508 for securing sensor lift mechanism 100 within tail cone 108. Backing plate 508 may mount to elevator frame 204 via rivets, screws, bolts, clamps, or other mechanical fasteners.

Roller carriage assembly 208 may be substantially parallel to lower beam 502 and upper beam 504 and substantially perpendicular to vertical beams 506a, 506b. A first roller track 512a and a second roller track 512b provide tracks configured for a roller to roll within thus maintaining alignment of roller carriage assembly 208 while the roller carriage assembly 208 is translating vertically. First roller track 512a may be mounted to first vertical beam 506a and second roller track 512b may be mounted to second vertical beam 506b. By mounting roller tracks 512a, 512b separately from vertical beams 506a, 506b, damage to roller tracks 512a, 512b may not propagate to vertical beams 506a, 506b, enabling replacement of only the damaged roller track. In some embodiments, a first roller fitting 510a, a second roller fitting 510b, a third roller fitting 510c, and a fourth roller fitting 510d are mounted to roller carriage assembly 208 and comprise track rollers (see FIG. 6) configured to roll up and down within first roller track 512a and second roller track 512b, respectively.

In operation, as sensor lift mechanism 100 deploys sensor 202, roller carriage assembly 208 may translate vertically down ball screw 302 via rollers in roller fittings 510a, 510b, 510c, 510d rolling within first roller track 512a and second roller track 512b. In some embodiments, roller tracks 512a, 512*b* comprise stainless steel (e.g., 17-4 Ph steel), aluminum, titanium, or alloys thereof to help withstand the high contact stresses induced by the track rollers. In some embodiments, roller tracks 512*a*, 512*b* comprise a wear-resistant coating, such as an ion or gas nitride coating, a plasma electrolytic oxidation coating, carbide, ceramic, molybdenum, and the like, to increase the wear resistance of the track surface and to aid in withstanding high contact stresses that may be induced by the track rollers. In some embodiments, roller tracks 512*a*, 512*b* are bolted, screwed, or clamped to vertical beams 506*a*, 506*b* such that roller tracks 512*a*, 512*b* are easily removable and replaceable in case of damage. In some embodiments, ball screw 302 extends substantially through the center of roller carriage assembly 208 as will be discussed in further detail below with respect to FIG. 6.

Figure 6:
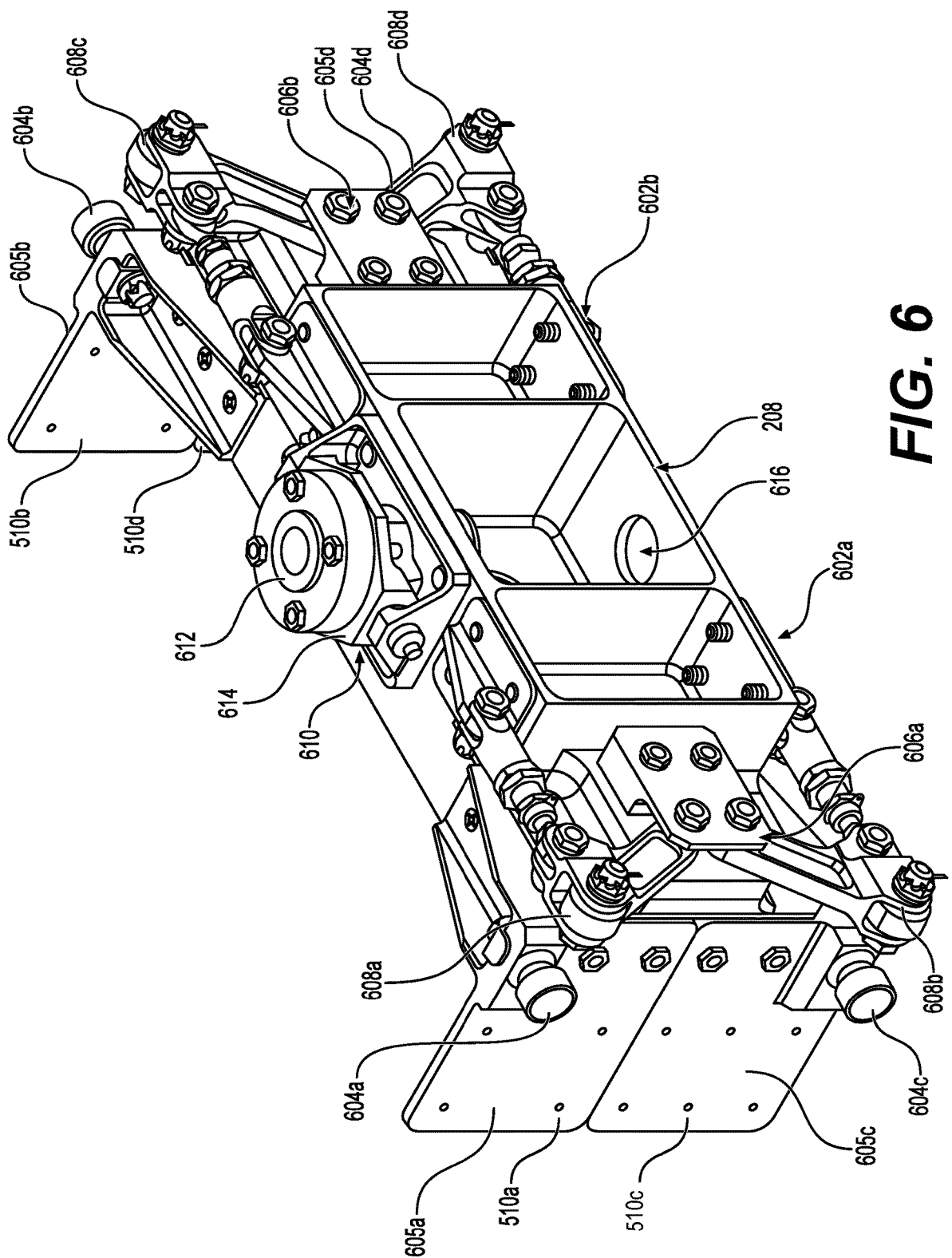
FIG. 6 illustrates an isometric view of a roller carriage assembly for the sensor lift mechanism for some embodiments.

FIG. 6 illustrates a back, isometric view of roller carriage assembly 208 with attached roller fittings 510*a*, 510*b* for some embodiments. In some embodiments, roller carriage assembly 208 comprises aluminum, stainless steel, titanium, or other like metals. In some embodiments, first roller fitting 510*a* and third roller fitting 510*c* are attached to a first end 602*a* of roller carriage assembly 208, and second roller fitting 510*b* and fourth roller fitting 510*d* are attached to a second end 602*b* of roller carriage assembly 208. In some embodiments, roller fittings 510*a*, 510*b*, 510*c*, 510*d* comprise aluminum, stainless steel, titanium, or other like metals. A first track roller 604*a* may be disposed on first roller fitting 510*a*, a second track roller 604*b* may be disposed on second roller fitting 510*b*, a third track roller 604*c* may be disposed on third roller fitting 510*c*, and fourth track roller 604*d* may be disposed on fourth roller fitting 510*d*. First track roller 604*a* may be disposed on a first side wall 605*a* of first roller fitting 510*a*, substantially near the top of first roller fitting 510*a*, towards drive unit 213 (see FIG. 5). Second track roller 604*b* may be disposed on second side wall 605*b* of second roller fitting 510*b*, substantially near the top of third roller fitting 510*c*. Third track roller 604*c* may be disposed on third side wall 605*c* of third roller fitting 510*c* and substantially near the bottom of third roller fitting 510*c*. Fourth track roller 604*d* may be disposed on fourth side wall 605*d* and substantially near the bottom of fourth roller fitting 510*d*. Side walls 605*a*, 605*b*, 605*c*, 605*d* may extend outwards from roller carriage assembly 208 away from side wall 110 of tail cone 108 (see FIG. 1B). Track rollers 604*a*, 604*b*, 604*c*, 604*d* may ride up and down roller tracks 512*a*, 512*b* as roller carriage assembly 208 translates vertically on ball screw 302.

Attached to a back side of roller carriage assembly 208 as shown in FIG. 6 is first drag roller assembly 606*a* and second drag roller assembly 606*b*. First drag roller assembly 606*a* may be mounted to first end 602*a*, and second drag roller assembly 606*b* may be mounted to second end 602*b*. First drag roller assembly 606*a* may comprise a first drag roller 608*a* and a second drag roller 608*b*. First drag roller 608*a* may be substantially parallel to first track roller 604*a*, and second drag roller 604*b* may be substantially parallel to second track roller 604*b*. Second drag roller assembly 606*b* may comprise a third drag roller 608*c* and a fourth drag roller 608*d*. Third drag roller 608*c* may be substantially parallel to third track roller 604*c*, and fourth drag roller 608*d* may be substantially parallel to fourth track roller 604*d*. Drag rollers 608*a*, 608*b*, 608*c*, 608*d* may also translate up and down roller tracks 512*a*, 512*b* as roller carriage assembly 208 translates vertically on ball screw 302.

Roller carriage assembly 208 may also comprise a ball nut swivel assembly 610 disposed on a top surface of roller carriage assembly 208 and substantially near the center of roller carriage assembly 208. Ball nut swivel assembly 610 may comprise ball nut 612 for receiving ball screw 302 therethrough and swivel 614 configured to prevent rotational moments applied to ball nut swivel assembly 610 from damaging ball nut 612 and/or ball screw 302. In some embodiments, ball nut 612 comprises a set of threads on an inner surface for mating to ball screw 302. Ball screw 302 may be inserted through ball nut 612 and through opening 616 in roller carriage assembly 208. Ball nut swivel assembly 610 may be configured to decouple ball nut 612 from any applied rotational deflections by the use of swivel 614, thus preventing any rotational moments from being applied to ball screw 302 and ball nut 612. When a rotational force is applied to ball nut swivel assembly 610, swivel 614 may be configured to rotate instead of ball nut 612 or ball screw 302, thus mitigating damage to ball nut 612 and ball screw 302 from the applied moment. Ball nut swivel assembly 610 may also serve to resist vertical forces applied to sensor lift mechanism 100, such as the weight of sensor 202 and/or any downwards aerodynamic force from deploying sensor 202 into the airstream.

Figure 7:
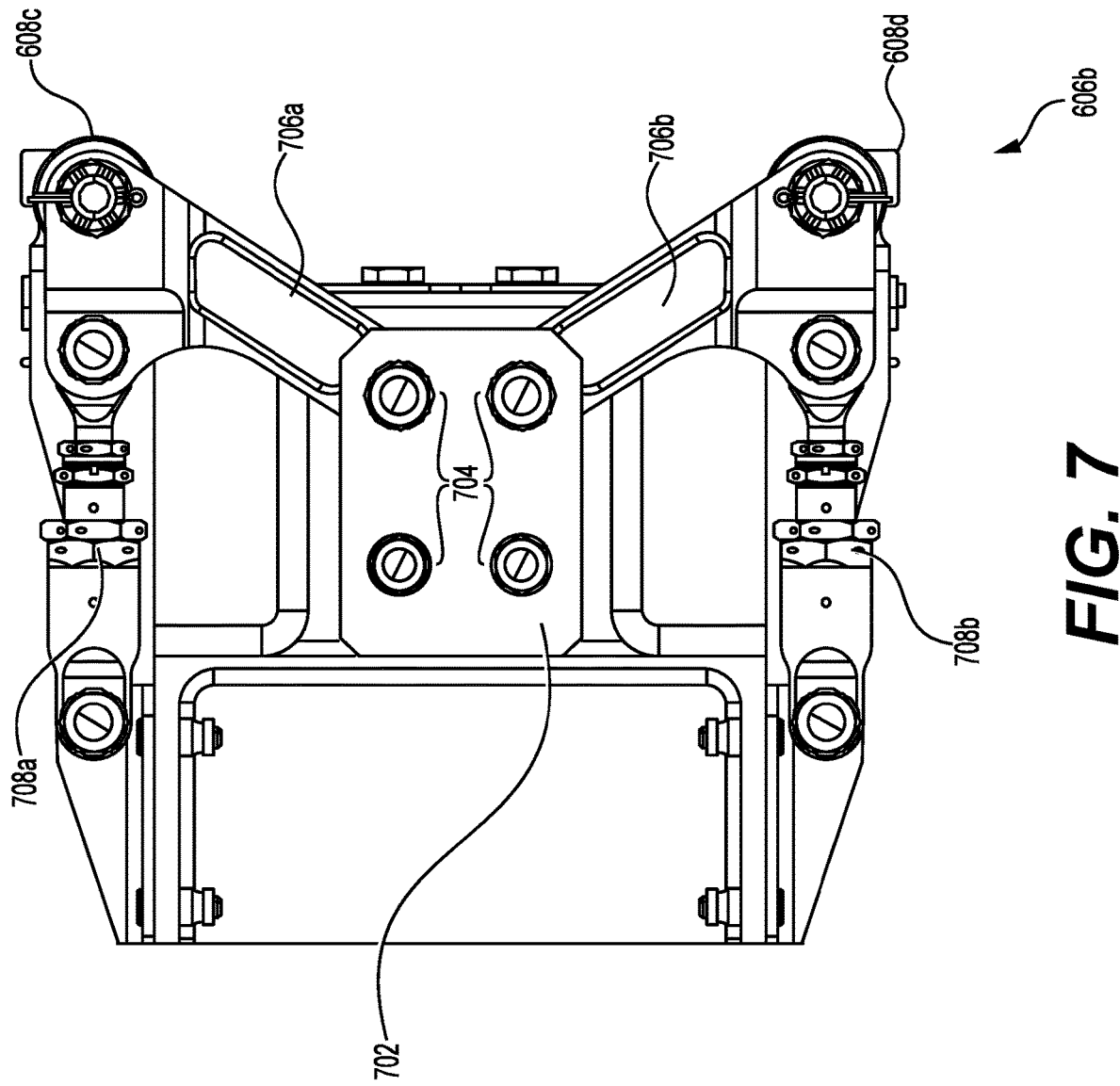
FIG. 7 illustrates a drag roller assembly disposed on the roller carriage assembly for some embodiments.

FIG. 7 illustrates a front, planar view of second drag roller assembly 606*b* for some embodiments. In some embodiments, first drag roller assembly 606*a* and second drag roller assembly 606*b* are substantially similar. Second drag roller assembly 606*b* may comprise a mounting plate 702 which may be mounted to second end 602*b* of roller carriage assembly 208 by bolts 704. In some embodiments, mounting plate 702 is fastened to second end 602*b* via rivets, screws, welds, or the like. Bolts 704 may also connect mounting plate 702 to swing arms 706*a*, 706*b*, with a first swing arm 706*a* attached to third drag roller 608*c* and a second swing arm 706*b* attached to fourth drag roller 608*d*. Swing arms 706*a*, 706*b* may pivot about bolts 704 in response to applied loads on sensor lift mechanism 100. Drag rollers 608*c*, 608*d* may also connect to roller adjuster arms 708*a*, 708*b* that may be adjusted for appropriate length to keep drag rollers 608*c*, 608*d* in contact with roller track 512*a* as roller carriage assembly 208 translates vertically. The adjustability of drag rollers 608*c*, 608*d* may account for the stack-up of fabrication and assembly tolerances of sensor lift mechanism 100, thus ensuring sensor lift mechanism 100 operates effectively at all tolerance conditions. Keeping drag rollers 608*c*, 608*d* in contact with second roller track 512*b* during operation reacts aerodynamic drag load, as drag rollers 608*c*, 608*d* are configured to withstand substantially high loads applied to sensor lift mechanism 100 during operation.

Figure 8:
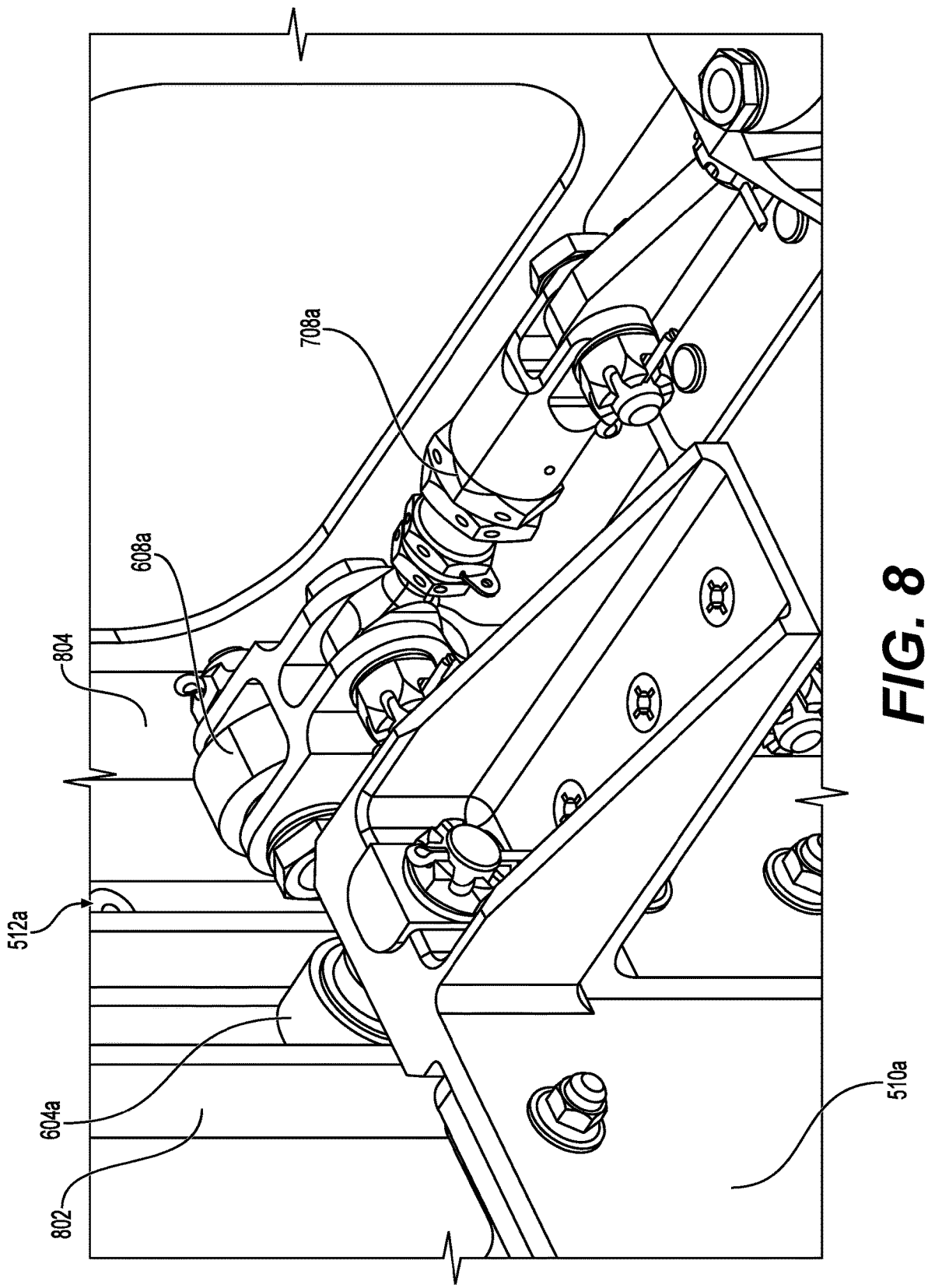
FIG. 8 illustrates a track roller interface for some embodiments.

FIG. 8 illustrates an isometric view of the interface between first track roller 604*a*, first drag roller 608*a*, and roller track 512*a* for some embodiments. In some embodiments, first roller track 512*a* is sized to be slightly larger than the combined width of first track roller 604*a* and first drag roller 608*a* such that first track roller 604*a* and first drag roller 608*a* may move within first roller track 512*a* in response to applied forces without damaging first roller track 512*a*. As shown, first track roller 604*a* may ride up side wall 802 of roller track 512*a* while first drag roller 608*a* may ride up back wall 804 of roller track 512*a*. In some embodiments, first track roller 604*a* is oriented substantially perpendicular to first drag roller 608*a*. In some embodiments, side wall 802 and/or back wall 804 comprises titanium, stainless steel (e.g., 17-4PH steel), aluminum, or alloys thereof to resist damage from drag rollers 608*a*, 608*b*, 608*c*, 608*d*. In some embodiments, track rollers 604*a*, 604*b*, 604*c*, 604*d* and/or drag rollers 608*a*, 608*b*, 608*c*, 608*d* serve to resist longitudinal and/or latitudinal forces applied to sensor 202 due to drag when deployed into the air stream. Track rollers 604a, 604b, 604c, 604d and/or drag rollers 608a, 608b, 608c, 608d may also resist any substantially longitudinal, lateral (e.g., inertial forces reacting about ball nut swivel assembly 610), or vertical force applied to sensor 202, such as an inertial loading force.

Figure 9:
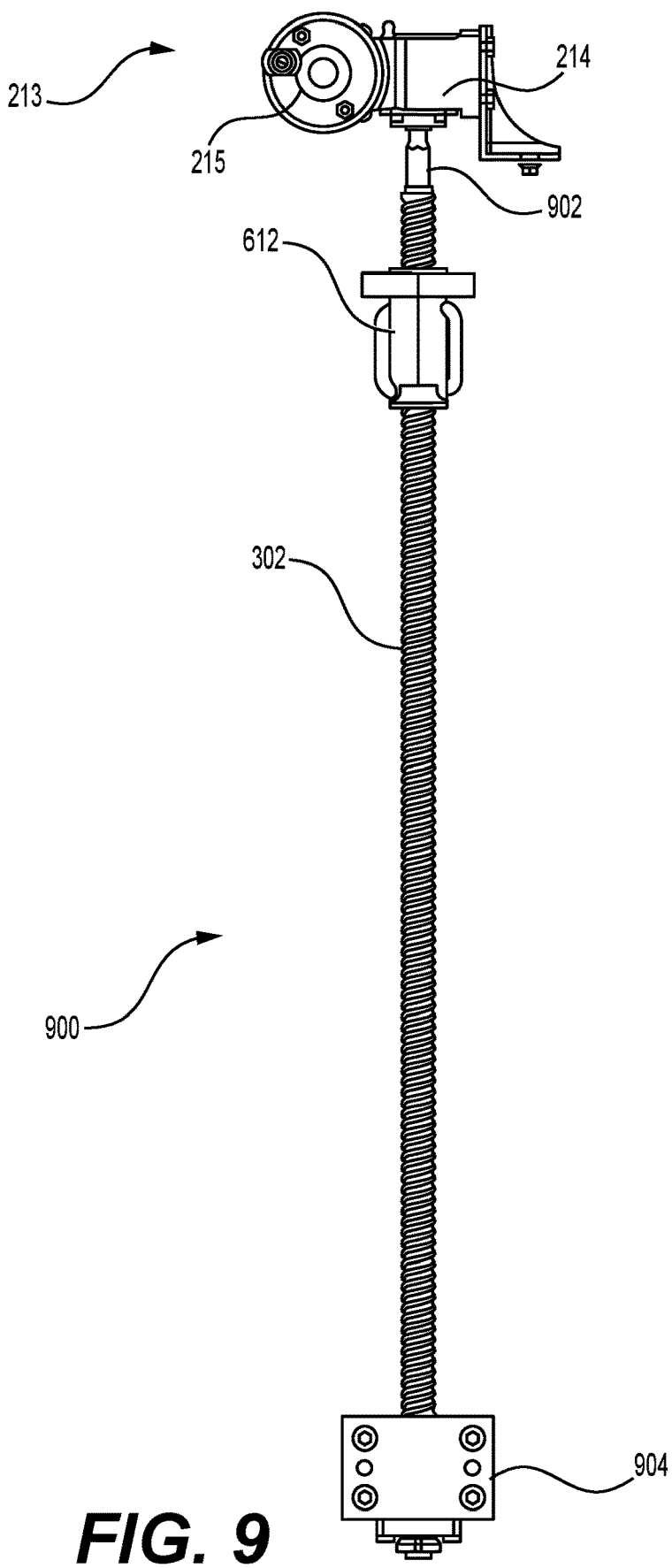
FIG. 9 illustrates a drive system for powering the sensor lift mechanism for some embodiments.

FIG. 9 illustrates drive system 900 for powering sensor lift mechanism 100 for some embodiments. As shown, drive system 900 comprises motor 215 coupled to gearbox 214 which powers the rotation of ball screw 302. In some embodiments, motor 215 is a brushed or a brushless DC motor. In some embodiments, motor 215 is a 28V DC brushed motor. Motor 215 may comprise high altitude brushes for operating at high altitudes. Drive system 900 may also comprise ball nut 612 attached to ball screw 302 as described above and an upper bearing 902 disposed near drive unit 213 and a lower bearing mount 904 disposed substantially near the bottom of sensor lift mechanism 100. In some embodiments, upper bearing 902 is connected to upper beam 504 to secure drive system 900 to elevator frame 204. Lower bearing mount 904 may mount drive system 900 to lower beam 502 of elevator frame 204. In some embodiments, ball screw 302 is configured to convert rotational movement into the linear motion of roller carriage assembly 208. In some embodiments, various other linear motion systems, such as lead screws, a pulley system, a belt system, a rack and pinion system, a roller pinion, or the like may be used to translating roller carriage assembly 208.

In some embodiments, ball screw 302 comprises a diameter of about 0.75 inches and a lead of about 0.5 inches. In some embodiments, ball screw 302 comprises a travel length of about 15 inches to about 26 inches such that sensor 202 travels about 15 inches to about 26 inches between the retracted position and the deployed position. In some embodiments, ball screw 302 comprises a travel length of about 18.5 inches. In some embodiments, ball screw 302 comprises an alloyed steel (e.g., 1045 alloy steel), aluminum, or titanium. In some embodiments, ball screw 302 is coated with chromium.

Figure 10A:
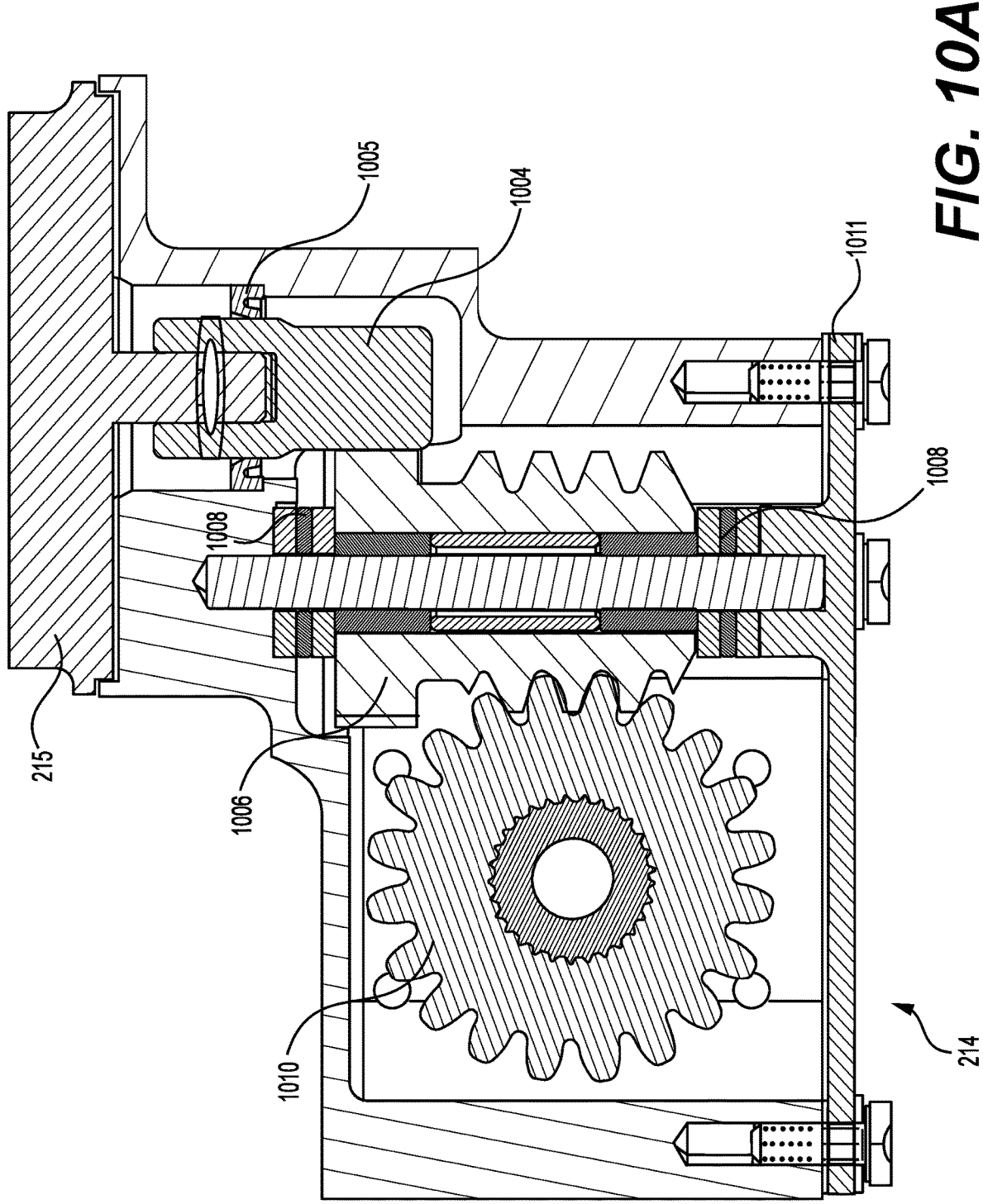
FIG. 10A illustrates a first view of a gearbox for the drive system for some embodiments.

FIG. 10A illustrates a first planar view of gearbox 214 for some embodiments. As shown gearbox 214 may be coupled to motor 215 connected to an input spur gear pair 1004. Motor casing 1002 may comprise stainless steel, aluminum, or titanium, and may be filled with grease for providing lubrication to the various gears within gearbox 214. In some embodiments, spur gear pair 1004 comprises a gear ratio of 2.5/1. In some embodiments, spur gear pair is sealed with input seal 1005. In some embodiments, input seal 1005 comprises a dual lip output shaft seal with a lubricant ring and a dust seal to prevent contaminants from entering gearbox 214. In some embodiments, input seal 1005 comprises a single lip shaft seal. In some embodiments, input seal 1005 comprises a felt shaft seal, wherein the felt shaft seal comprises a felt washer. Spur gear pair 1004 may mate with worm 1006 as shown. In some embodiments, worm thrust bearings 1008 are provided on the ends of worm 1006 to resist thrust and rotation applied to worm 1006. In some embodiments, worm thrust bearings 1008 are thrust and needle bearings. Worm 1006 may mate to a worm gear 1010. In some embodiments, worm 1006 and worm gear 1010 prevent motor 215 from being backdriven, thus preventing sensor lift mechanism 100 from moving when motor 215 is off. In some embodiments, motor 215, ball screw 302, and limit switches 216a, 216b, 216c, 216d restrains sensor platform 210 in the vertical direction within isolator beams 106a, 106b. Preventing motor 215 from being backdriven also allows drive unit 213 to operate without a brake in some embodiments. In some embodiments, the worm 1006 and worm gear 1010 have a gear ratio of 20/1. In some embodiments, gearbox 214 comprises an overall gear ratio of 50/1. Gearbox 214 may also comprise a front plate gasket assembly 1011 to seal gearbox 214. In some embodiments, gearbox 214 is filled with grease to provide lubrication to the various gears.

Figure 10B:
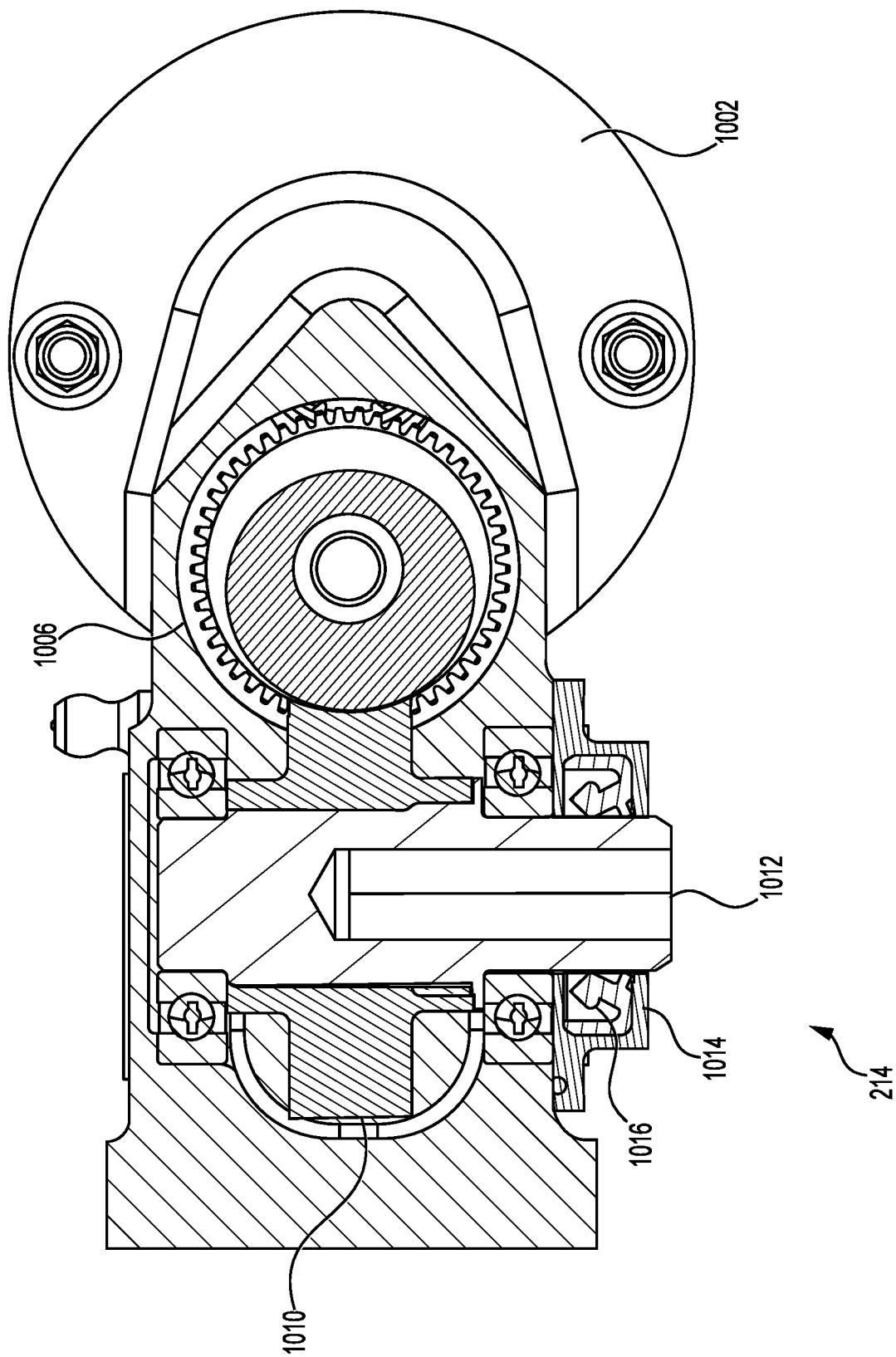
FIG. 10B illustrates a second view of the gearbox for the drive system for some embodiments.

FIG. 10B illustrates a second planar view of a gearbox 214 for drive unit 213 for some embodiments. As shown, worm 1006 may drive output shaft 1012 which may in turn drive ball screw 302. Also illustrated in FIG. 10B is output shaft housing 1014. In some embodiments, gearbox 214 is completely sealed via output shaft housing 1014 which may comprise a dual lip output shaft seal 1016 with a lubricant ring and a dust seal to prevent contaminants from entering gearbox 214. In some embodiments, output shaft seal 1016 and input shaft seal 1005 are substantially similar.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A sensor lift mechanism for use in an aircraft, comprising:
   a frame, comprising:
      a first roller track disposed on a first vertical beam; and
      a second roller track disposed on a second vertical beam,
      wherein the first vertical beam and the second vertical beam are substantially in parallel;
   a roller carriage assembly disposed within the frame, comprising:
      a first pair of track rollers configured to roll up a side wall of the first roller track;
      a second pair of track rollers configured to roll up a side wall of the second roller track;
      a first pair of drag rollers configured to roll up a back wall of the first roller track; and
      a second pair of drag rollers configured to roll up a back wall of the second roller track; and
   a drive unit mounted to an upper beam of the frame,
      wherein the drive unit powers a ball screw and translates the roller carriage assembly vertically between the first vertical beam and the second vertical beam to move a sensor between a stowed position and a deployed position.

2. The sensor lift mechanism of claim 1, wherein the sensor lift mechanism is disposed within a tail cone of the aircraft above a track door such that the track door is opened for deploying the sensor downwards beneath the tail cone of the aircraft.

3. The sensor lift mechanism of claim 2, wherein the frame is mounted onto a side wall of the tail cone via a mounting assembly.

4. The sensor lift mechanism of claim 2, comprising:
a first isolator beam disposed transversely across the tail cone on a forward side of sensor lift mechanism; and
a second isolator beam disposed transversely across the tail cone on an aft side of sensor lift mechanism,
wherein the first and second isolator beams are each configured to attach to intercostals within the tail cone.

5. The sensor lift mechanism of claim 4, comprising a sensor platform mechanically coupled to the carriage assembly, wherein the sensor is fastened to the sensor platform.

6. The sensor lift mechanism of claim 5, wherein the sensor platform is configured to rest on the first and second isolator beams when the sensor is in the deployed position.

7. The sensor lift mechanism of claim 6, wherein the first and second isolator beams are configured to reduce vibrations and dampen forces applied to sensor lift mechanism when in the deployed position.

8. The sensor lift mechanism of claim 5, wherein the first isolator beam comprises a first isolator and a second isolator, and the second isolator beam comprises a third isolator and a fourth isolator, and each of the first second, third, and fourth isolators, comprises a vertically-oriented cylindrical opening.

9. The sensor lift mechanism of claim 8, wherein the sensor platform comprises a first outrigger aligned with the first isolator, a second outrigger aligned with the second isolator, a third outrigger aligned with the third isolator, and a fourth outrigger aligned with the fourth isolator, wherein the first, second, third, and fourth outriggers each comprise a vertically-oriented dagger pin configured for insertion into the first, second, third, and fourth isolators, respectively.

10. The sensor lift mechanism of claim 8, wherein each of the first second, third, and fourth isolators comprise an isolation material configured to aid in vibration damping for mitigating vibrational forces exerted on the sensor by an airstream while the sensor is in the deployed position.

11. The sensor lift mechanism of claim 1, wherein the side wall of the first roller track is substantially perpendicular to the back wall of the first roller track, and the side wall of the second roller track is substantially perpendicular to the back wall of the second roller track, such that the first and second pairs of track rollers are configured to resist transverse motion of the roller carriage assembly and the first and second pairs of drag rollers are configured to resist longitudinal motion of the roller carriage assembly, such that alignment of roller carriage assembly is maintained during flight while the roller carriage assembly is translating vertically.

12. The sensor lift mechanism of claim 1, comprising a top limit switch disposed near a top of the frame, a bottom limit switch disposed near a bottom of the frame, wherein the top limit switch is used to determine a stowed position of the sensor and the bottom limit switch is used to determine a deployed position of the sensor.

13. The sensor lift mechanism of claim 12, when either the top limit switch or the bottom limit switch is triggered, a signal is sent to the drive unit to power off.

14. A sensor lift mechanism for deploying a sensor from a tail cone of an aircraft, the sensor lift mechanism comprising:
a frame mounted onto a side wall of the tail cone via a mounting assembly, wherein the frame comprises a first roller track and a second roller track aligned with the first roller track;
a roller carriage assembly having a plurality of rollers configured for rolling along the first and second roller tracks;
a sensor platform mechanically coupled to the carriage assembly, wherein the sensor platform is configured for mounting the sensor thereto; and
a drive unit operatively coupling to the frame, wherein the drive unit translates the roller carriage assembly vertically between the first and second roller tracks to move the sensor platform between a stowed position and a deployed position,
wherein a floor of the tail cone comprises a track door configured to open for deploying the sensor beneath the tail cone.

15. The sensor lift mechanism of claim 14, wherein the first roller track comprises a first side facing a first direction and a second side facing a second direction perpendicular to the first direction, and the second roller track a third side facing the first direction and a fourth side facing the second direction.

16. The sensor lift mechanism of claim 15, wherein the plurality of rollers comprises a first roller configured to roll along the first side, a second roller configured to roll along the second side, a third roller configured to roll along the third side, and a fourth roller configured to roll along the fourth side, such that the carriage assembly is supported in the first direction and the second direction while rolling along the first track and the second track.

17. The sensor lift mechanism of claim 14, comprising:
a first isolator beam disposed transversely across the tail cone on a forward side of the sensor lift mechanism;
a second isolator beam disposed transversely across the tail cone on an aft side of the sensor lift mechanism,
wherein the first and second isolator beams are each configured to attach to intercostals within the tail cone; and
the sensor platform is configured to abut the first and second isolator beams when the sensor is in the deployed position.

18. The sensor lift mechanism of claim 17, comprising:
a first pair of receptacles in the first isolator beam;
a second pair of receptacles in the second isolator beam;
a forward pair of extensions on the forward side of the sensor platform; and
an aft pair of extensions on the aft side of the sensor platform,
wherein the forward pair of extensions are configured for insertion into the first pair of receptacles and the aft pair of extensions are configured for insertion into the second pair of receptacles when the sensor is in the deployed position.

19. The sensor lift mechanism of claim 14, wherein the drive unit comprises:
a motor configured for driving the drive unit; and
a gearbox operatively coupled to the motor, wherein the gearbox comprises a worm and a worm gear configured to prevent the motor from being backdriven when the motor is off.

20. The sensor lift mechanism of claim 19, comprising:
a top limit switch disposed near a top of the frame for determining a stowed position of the sensor; and
a bottom limit switch disposed near a bottom of the frame for determining a deployed position of the sensor,
wherein the top limit switch and the bottom limit switch are configured to signal the motor to power off when either the top limit switch or the bottom limit switch is triggered.

* * * * *